US010174182B2

(12) United States Patent
An et al.

(10) Patent No.: US 10,174,182 B2
(45) Date of Patent: Jan. 8, 2019

(54) COMPOSITIONS AND ARTICLES OF MANUFACTURE CONTAINING SILOXANE

(75) Inventors: Narong An, Shanghai (CN); Yu Ren, Shanghai (CN); Dake Shen, Shanghai (CN); Yaming Niu, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 618 days.

(21) Appl. No.: 13/148,354

(22) PCT Filed: Nov. 15, 2010

(86) PCT No.: PCT/CN2010/078736
§ 371 (c)(1),
(2), (4) Date: Jul. 3, 2013

(87) PCT Pub. No.: WO2012/065292
PCT Pub. Date: May 24, 2012

(65) Prior Publication Data
US 2013/0274391 A1    Oct. 17, 2013

(51) Int. Cl.
*C08K 5/42*    (2006.01)
*C08L 69/00*   (2006.01)
*C08K 5/00*    (2006.01)
*C08L 83/04*   (2006.01)

(52) U.S. Cl.
CPC ............. *C08K 5/42* (2013.01); *C08K 5/0066* (2013.01); *C08L 69/00* (2013.01); *C08L 83/04* (2013.01); *C08L 2205/02* (2013.01)

(58) Field of Classification Search
CPC .......... C08L 69/00; C08L 77/06; C08K 3/22; C08K 5/42; C08K 7/04; C08K 7/14; C08K 13/04; C08K 2003/2241; C08K 2003/2296; H01L 33/60
See application file for complete search history.

(56) References Cited

U.S. PATENT DOCUMENTS

| 4,286,083 | A | | 8/1981 | Kochanowski |
| 5,360,861 | A | * | 11/1994 | Campbell ............ 524/494 |
| 6,353,046 | B1 | | 3/2002 | Rosenquist et al. |
| 6,462,111 | B1 | * | 10/2002 | Singh .......... C08K 5/02 524/108 |
| 7,632,881 | B2 | | 12/2009 | Chen et al. |
| 7,652,083 | B2 | | 1/2010 | Mullen |
| 2002/0037966 | A1 | * | 3/2002 | Weidner ........... C08L 69/00 525/143 |
| 2007/0029917 | A1 | | 2/2007 | Hong et al. |
| 2008/0081860 | A1 | * | 4/2008 | Li ............ C08G 64/14 524/414 |

FOREIGN PATENT DOCUMENTS

| JP | H06329894 A | 11/1994 |
| KR | 1020020091248 A | 12/2002 |

OTHER PUBLICATIONS

International Search Report; International Application No. PCT/CN2010/078736; International Filing Date: Nov. 15, 2010; dated Aug. 25, 2011; 7 Pages.
Written Opinion of the International Searching Authority; International Application No. PCT/CN2010/078736; International Filing Date: Nov. 15, 2010; dated Aug. 25, 2011; 5 Pages.
Search Report for International Application No. 201080071116.4; International Filing Date: Nov. 15, 2010; dated Apr. 21, 2014

* cited by examiner

*Primary Examiner* — Robert T Butcher
(74) *Attorney, Agent, or Firm* — Cantor Colburn LLP

(57) ABSTRACT

Compositions containing a polycarbonate and a linear and cyclic phenyl containing siloxanes are disclosed. Specifically, a composition comprising: (a) a branched polycarbonate resin, (b) a flame retardant, (c) at least one linear phenyl containing siloxane and at least one cyclic phenyl containing siloxane, and (d) a linear polycarbonate resin when said branched polycarbonate is less than 100% based upon weight percent of total polycarbonate in said composition, wherein the amounts of said branched and linear polycarbonate resins, said linear siloxanes and cyclic siloxanes, and flame retardant are in amounts effective to provide a molded article from said composition with a UL94 V0 p(FTP) value of 0.90 or greater at a thickness of between 1 mm and 2.5 mm or at 2.5 mm or at 1.5 mm or at 1 mm is disclosed. In addition, a composition comprising: (a) a linear polycarbonate resin, (b) a flame retardant, (c) at least one phenyl-containing linear siloxane and at least one phenyl-containing cyclic siloxane, wherein the amounts of said linear polycarbonate resins, said phenyl-containing linear siloxanes and said phenyl-containing cyclic siloxanes, and said flame retardant are in amounts effective to provide a molded article of said composition with a UL94 V0 p(FTP) value of 0.90 or greater at a thickness of between 1 mm and 2.5 mm or at 2.5 mm or at 1.5 mm or at 1 mm is disclosed.

40 Claims, No Drawings

COMPOSITIONS AND ARTICLES OF MANUFACTURE CONTAINING SILOXANE

FIELD OF THE INVENTION

This disclosure relates to compositions containing polycarbonate resins with flame-retardant properties, as well as articles of manufacture that include said compositions.

BACKGROUND OF THE INVENTION

Polycarbonate resins have been used extensively in the fabrication of electrical and electronic equipment due to excellent electrical properties, transparency and mechanical strength, especially impact strength. Electrical and electronic equipment are subject to stringent safety requirements, particularly in the area of fire/flame retardancy. These safety requirements are difficult to achieve in thin wall articles, e.g. those with a wall thickness of about 1.5 mm or less. It is becoming increasingly desirable for safety requirements to be met without using chlorinated or brominated fire retardants. Thus, it is clear that meeting safety requirements in a transparent polycarbonate composition without the use of chlorinated or brominated flame retardants is a significant challenge, especially in compositions useful in injection molding and/or thin wall applications.

SUMMARY OF THE INVENTION

The present disclosure provides for a composition comprising: (a) a branched polycarbonate resin, (b) a flame retardant, (c) at least one linear phenyl containing siloxane and at least one cyclic phenyl containing siloxane, and (d) a linear polycarbonate resin when said branched polycarbonate is less than 100% based upon weight percent of total polycarbonate in said composition, wherein the amounts of said branched and linear polycarbonate resins, said linear siloxanes and cyclic siloxanes, and flame retardant are in amounts effective to provide a molded article from said composition with a UL94 V0 p(FTP) value of 0.90 or greater at a thickness of between 1 mm and 2.5 mm or at 2.5 mm or at 1.5 mm or at 1 mm.

The present disclosure also provides for a composition comprising: (a) a linear polycarbonate resin, (b) a flame retardant, (c) at least one phenyl-containing linear siloxane and at least one phenyl-containing cyclic siloxane, wherein the amounts of said linear polycarbonate resins, said phenyl-containing linear siloxanes and said phenyl-containing cyclic siloxanes, and said flame retardant are in amounts effective to provide a molded article of said composition with a UL94 V0 p(FTP) value of 0.90 or greater at a thickness of between 1 mm and 2.5 mm or at 2.5 mm or at 1.5 mm or at 1 mm.

DETAILED DESCRIPTION OF THE INVENTION

As stated above, the composition of this disclosure comprises: (a) a branched polycarbonate resin, (b) a flame retardant, (c) at least one linear phenyl containing siloxane and at least one cyclic phenyl containing siloxane, and (d) a linear polycarbonate resin when said branched polycarbonate is less than 100% based upon weight percent of total polycarbonate in said composition, wherein the amounts of said branched and linear polycarbonate resins, said linear siloxanes and cyclic siloxanes, and flame retardant are in amounts effective to provide a molded article from said composition with a UL94 V0 p(FTP) value of 0.90 or greater at a thickness of between 1 mm and 2.5 mm or at 2.5 mm or at 1.5 mm or at 1 mm.

In another embodiment, the compositions of the present disclosure can contain a combination of branched and linear polycarbonate resins or just linear polycarbonates and blends thereof.

When there is no branched polycarbonate, the chemistries are in amounts effective to provide a molded article from said composition with a UL94 V0 p(FTP) value of 0.90 or greater at a thickness of between 1 mm and 2.5 mm or at 2.5 mm or at 1.5 mm or at 1 mm. Specifically, in one embodiment, the composition comprises: (a) a linear polycarbonate resin, (b) a flame retardant, (c) at least one phenyl-containing linear siloxane and at least one phenyl-containing cyclic siloxane, wherein the amounts of said linear polycarbonate resins, said phenyl-containing linear siloxanes and said phenyl-containing cyclic siloxanes, and said flame retardant are in amounts effective to provide a molded article of said composition with a UL94 V0 p(FTP) value of 0.90 or greater at a thickness of between 1 mm and 2.5 mm or at 2.5 mm or at 1.5 mm or at 1 mm.

Various methodologies for synthesis of said branched and linear polycarbonates would be well known to one of ordinary skill in the art, e.g. interfacial polymerization and melt process polymerizations, e.g. as described in U.S. Pat. Nos. 7,652,083 and 4,286,083, which are herein incorporated by reference.

The polycarbonates of the present disclosure can be described as follows.

Polycarbonates of the present disclosure have repeating structural carbonate units of the formula (1):

wherein at least 60 percent of the total number of $R^1$ groups contains aromatic organic groups and the balance thereof are aliphatic, alicyclic, or aromatic groups. In one embodiment, each $R^1$ group is a divalent aromatic group, for example derived from an aromatic dihydroxy compound of the formula (3):

$$\text{HO-A}^1\text{-Y}^1\text{-A}^2\text{-OH} \tag{2}$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (2) are bisphenol compounds of general formula (3):

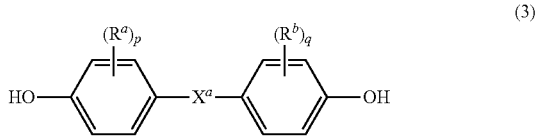

(3)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (4) or (5):

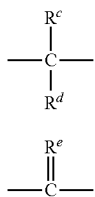

(4)

(5)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

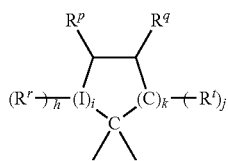

(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (7) will have an unsaturated carbon-carbon linkage where the ring is fused. When k is 1 and i is 0, the ring as shown in formula (7) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

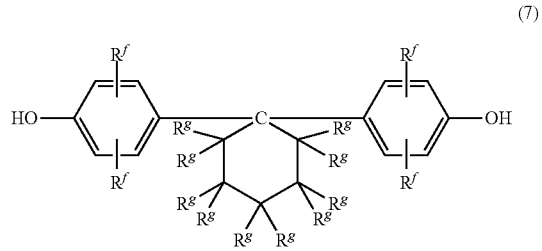

(7)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (8):

(8)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

Polycarbonate" as used herein includes homopolycarbonates, copolymers comprising different $R^1$ moieties in the carbonate (referred to herein as "copolycarbonates"), and polycarbonate copolymers comprising carbonate units and other types of polymer units, such as ester units.

One specific type of copolymer is a polyester carbonate, also known as a polyester-polycarbonate. Such copolymers further contain, in addition to recurring carbonate chain units of the formula (1), repeating units of formula (9):

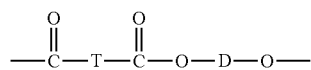

(9)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (4) above. In another embodiment, D is derived from an aromatic dihydroxy compound of formula (9) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates). Examples of aliphatic dicarboxylic acids that can be used to prepare the polyester units include adipic acid, sebacic acid and dodecanoic acid.

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

A specific example of a polycarbonate copolymer is a copolycarbonate-polysiloxane copolymer comprising carbonate units of formula (1) and polysiloxane (also referred to herein as "polydiorganosiloxane") units of formula (10):

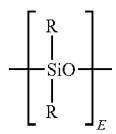

(10)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (11) may vary widely depending on the type and relative amount of each component in the thermoplastic composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 12.

In an embodiment, polydiorganosiloxane units are derived from dihydroxy aromatic compound of formula (11):

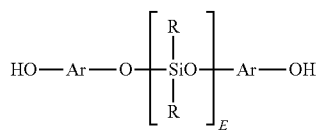

(11)

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (12) may be derived from a $C_{6-30}$ dihydroxy aromatic compound, for example a dihydroxy aromatic compound of formula (3), (4), (8), or (9) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

In another embodiment, polydiorganosiloxane units are derived from dihydroxy aromatic compound of formula (12):

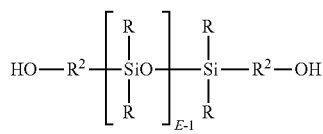

(12)

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are derived from dihydroxy aromatic compound of formula (13):

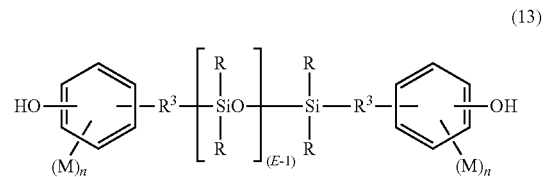

(13)

wherein R and E are as defined above. Each $R^3$ is independently a divalent $C_{2-8}$ aliphatic group. Each M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$,

[CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_{1-8}$ alkoxy group or a C$_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing Exemplary transesterification catalysts for making polycarbonate using a melt process include acetates, carbonates, borates, borohydrides, oxides, hydroxides, hydrides, and alcoholates of various metals including alkali metals such as lithium, sodium, and potassium, alkali earth metals such as magnesium, calcium and barium and other metals such as zinc, cadmium, tin, antimony, lead, manganese cobalt, or nickel. In addition, other useful transesterification catalysts include basic salts of nitrogen or phosphorus such as tetrabutylammonium hydroxide, methyltributylammonium hydroxide, tetrabutylammonium acetate, tetrabutylphosphonium hydroxide, tetrabutylphosphonium acetate, tetrabutylphosphonium phenolate. Combinations of at least one of the foregoing are also useful.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic acid anhydride, trimellitic acid trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent and may lead to viscosity problems during phosgenation. Therefore, in some embodiments, an increase in the amount of a chain termination agent is used in the polymerization. The amount of chain termination agent used when the particular branching agent is used is generally higher than if only a chain termination agent alone is used. The amount of chain termination agent used is generally above 5 mole percent and less than 20 mole percent compared to the bisphenol monomer.

In some embodiments, the branching agent is a structure derived from a triacid trichloride of the formula (14)

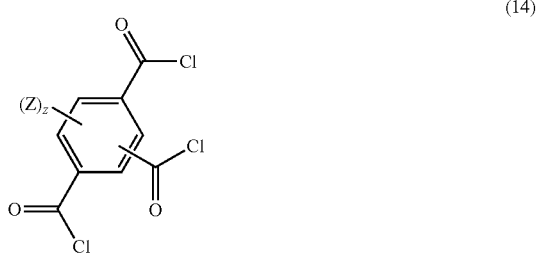

wherein Z is hydrogen, a halogen, C$_{1-3}$ alkyl group, C$_{1-3}$ alkoxy group, C$_{7-12}$ arylalkyl, alkylaryl, or nitro group, and z is 0 to 3; or a branching agent derived from a reaction with a tri-substituted phenol of the formula (15)

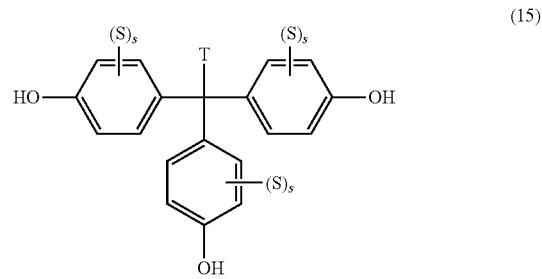

wherein T is a C$_{1-20}$ alkyl group, C$_{1-20}$ alkyleneoxy group, C$_{7-12}$ arylalkyl, or alkylaryl group, S is hydrogen, a halogen, C$_{1-3}$ alkyl group, C$_{1-3}$ alkoxy group, C$_{7-12}$ arylalkyl, alkylaryl, or nitro group, s is 0 to 4.

In another embodiment, the branching agent is a structure having formula (16)

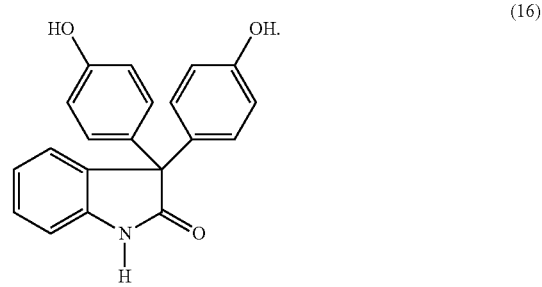 [SMILES: O=C1Nc2ccccc2C1(c1ccc(O)cc1)c1ccc(O)cc1]

Examples of specific branching agents that are particularly effective in the compositions include trimellitic trichloride (TMTC), tris-p-hydroxy phenyl ethane (THPE) and isatin-bis-phenol. In one embodiment, in formula (21), z is hydrogen and z is 3. In another embodiment, in formula (15), S is hydrogen, T is methyl and s is 4.

The relative amount of branching agents used in the manufacture of the polymer will depend on a number of considerations, for example the type of $R^1$ groups, the amount of end-capping agent, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (21), the amount of branching agent tri-ester groups are present in an amount of about 0.1 to 10 branching units per 100 $R^1$ units, specifically about 0.5 to 8 branching units per 100 $R^1$ units, and more specifically about 0.75 to 5 tri-ester units per 100 $R^1$ units. For branching agents having formula (22), the amount of branching agent tricarbonate groups are present in an amount of about 0.1 to 10 branching units per 100 $R^1$ units, specifically about 0.5 to 8 branching units per 100 $R^1$ units, and more specifically about 0.75 to 5 tri-phenylcarbonate units per 100 $R^1$ units. In some embodiments, a combination of two or more branching agents may be used.

Various endcapping agents can be used provided that such agents do not significantly adversely affect or improve the desired properties of the compositions, such as transparency, ductility, fire retardants, and the like.

Exemplary additional chain stoppers include certain other mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, and p-t-butyl phenol; and monoesters of diphenols, such as p-methoxyphenol, phenols with phenols with cyano-substitution such as p-cyanophenol, or with halogen substitution such as p-fluorophenol, or with nitro-substitution such as 4-nitrophenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzo-triazoles and their derivatives, 2-(2-hydroxyaryl)-1,3,5-tri-azines and their derivatives, and the like.

In one embodiment, the polycarbonate has an end-cap containing at least one of the following: phenol, alkyl-substituted phenols, ether-substituted phenols, ester-substituted phenols, cyano-substituted phenols, and halogen substituted phenols.

In another embodiment, the branched polycarbonate resin has a molecular weight of between about 26,000 and about 42,000 daltons.

In another embodiment, the branching level of said branched polycarbonate resin is from about 0.05% to about 4.2%.

In another embodiment, the branching level of said polycarbonate is selected from at least one of the following: 0.29%, 0.4% and 3%.

In another embodiment, the composition contains between about 5% and about 100% branched polycarbonate resin. In a further embodiment, the composition has about 5% to about 70% branched polycarbonate resin.

In another embodiment, the linear polycarbonate resin has a molecular weight of between about 26,000 and about 42,000 daltons.

In another embodiment, the composition contains about 95% or less linear containing polycarbonate resin.

In another embodiment, the composition contains a blend of linear polycarbonates.

Silicon containing additives are incorporated into the compositions of the present disclosure.

In one embodiment, the silicon-containing additive is a linear and cyclic siloxane, specifically a linear phenyl containing siloxane and cyclic phenyl containing siloxane.

In another embodiment, the composition contains about 0.1% or greater of a siloxane phenyl containing additive.

In another embodiment, the silicon-containing additive is an octaphenyl cyclotetrasiloxane.

In another embodiment, the composition contains about 0.1% or greater of said octaphenyl cyclotetrasiloxane.

In another embodiment, at least the following two siloxane based chemistries: octaphenyl cyclotetrasiloxane, and a poly(phenylmethylsiloxane) having the following structure

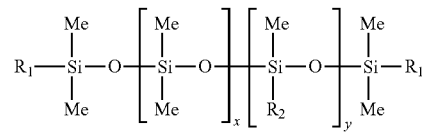

wherein R1 is a C1-C18 alkyl group and x and y sum to 1.

In another embodiment, the composition has at two least types of siloxanes in said composition.

In another embodiment, the composition has between about 0.1% and about 0.8% polymethylsiloxanes and about 0.1% to about 0.8% octaphenyl cyclotetrasiolxane.

In another embodiment, the composition contains about 0.1% or greater of said octaphenyl cyclotetrasiloxane.

Flame-retardants are incorporated into the compositions of the present disclosure. Various types of flame-retardants can be utilized for the compositions encompassed by this disclosure.

Useful flame retardants are salt based flame retardants, such as alkali metal or alkaline earth metal salts of inorganic protonic acids as well as organic Brönsted acids comprising at least one carbon atom. Preferably the salt based flame retardants are sulfonic acid salts. Non-limiting examples of sulfonic acid salts are perfluoroalkane sulfonate alkali metal, $C_1$-$C_6$ alkylammonium, or ammonium salts. Such salts are described in the above-mentioned U.S. Pat. No. 3,775,367, and include, for example, salts such as sodium, potassium, or tetraethyl ammonium perfluoromethylbutane sulfonate; sodium, potassium, or tetraethyl ammonium perfluoromethane sulfonate; sodium, potassium, or tetraethyl ammonium perfluoroethane sulfonate; sodium, potassium, or tetraethyl ammonium perfluoropropane sulfonate; sodium, potassium, or tetraethyl ammonium perfluorohexane sulfonate; sodium, potassium, or tetraethyl ammonium perfluoroheptane sulfonate; sodium, potassium, or tetraethyl ammonium perfluoroctanesulfonate; sodium, potassium, or tetraethyl ammonium perfluorobutane sulfonate; and sodium, potassium, or tetraethyl ammonium diphenylsulfon-3-sulfonate; and mixtures of two or more of the foregoing salts. In one embodiment the flame retardant is selected from the group consisting of potassium diphenylsulfon-3-sulfonate (KSS), potassium perfluorobutane-sulfonate (Rimar salt), potassium perfluoromethane-sulfonate and combinations comprising at least one of the foregoing.

In one embodiment, the fire retardant is at least one of the following: KSS, NATS, and ionomer.

The flame retardant is present in an amount of about 0.005 to about 2 weight percent, based on the weight of the polycarbonate. Within this range the flame retardant may be present in an amount greater than or equal to about 0.01 or greater than or equal to about 0.02 weight percent. Also within this range the flame retardant may be present in an amount less than or equal to about 1.5, or less than or equal to about 1.0 weight percent.

The composition may further comprise polytetrafluoroethylene (PTFE). PTFE is typically added as an additive known as TSAN. TSAN is made by copolymerizing styrene and acrylonitrile in the presence of an aqueous dispersion of PTFE. Typically TSAN contains 50 parts by weight (pbw) PTFE and 50 pbw of a styrene-acrylonitrile copolymer containing 75 wt % styrene and 25 wt % acrylonitrile). In some cases the polytetrafluoroethylene is encapsulated in the styrene acrylonitrile resin. Useful amounts of TSAN are about 0.02 to about 1.5 weight percent, based on the total weight of the polycarbonate. Within this range TSAN may be present in an amount greater than or equal to about 0.07 or greater than or equal to about 0.1 weight percent. Also within this range TSAN may be present in an amount less than or equal to about 1.2 or less than or equal to about 1.0 or less than or equal to about 0.5 weight percent. Useful flame retardant additives also include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful, for example, compounds of the formulas below:

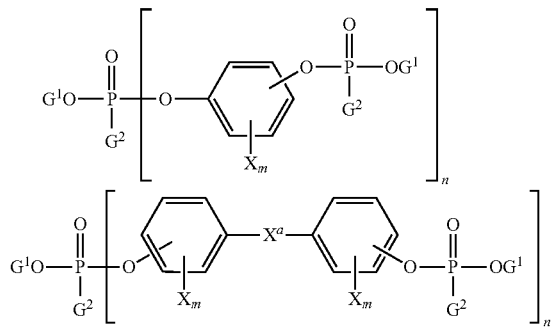
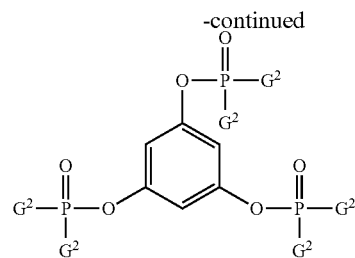

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

Halogenated organic flame retardant compounds can also be used as flame retardants, for example halogenated flame retardant compounds of formula (17):

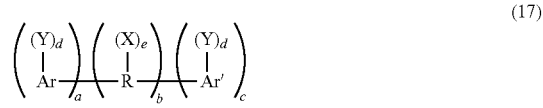

(17)

wherein R is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (17) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

A useful class of compounds that can be combined with the flame retardant additive is the class of cyclic siloxanes having the general formula $(R'_2SiO)_y$ wherein R' is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3, 3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane. The use of octaphenylcyclotetrasiloxane in combination with Rimar Salt has been often been found to improve the flame performance and also to increase the transparency and reduce the haze of polycarbonate compositions.

Another useful class of compounds that can be combined with flame retardant additives or used in combination with cyclic siloxanes with flame retardant additives are poly (phenylalkylsiloxanes) where the alkyl group is a C1-C18 alkyl group. One specific example of a poly(phenylalkylsiloxane) is a poly(phenylmethylsiloxane).

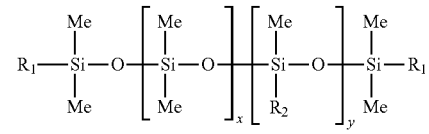

(18)

where R1 is methyl and R2 is phenyl and x and y can vary in ratio but sum to 1. The presence of phenyl groups in the linear siloxane structure in general improves transparency and reduces haze in the polycarbonate formulation. One such poly(phenylmethylsiloxane) is available commercially from Toshiba Silicone Co. LTD. as TSF437. TSF437 is a liquid at room temperature (viscosity 22 centistokes @ 25° C.) and so is particularly convenient to add to polymer compositions.

Combining phenyl-containing cyclic siloxanes such as octaphenylcyclotetrasiloxane with phenyl containing linear siloxanes such as TSF437 with flame retardant additives such as Rimar salt has been found to be particularly effective in providing excellent flame performance and high impact performance while maintaining excellent transmittance and low haze in polycarbonate compositions.

In one embodiment, the flame retardant contains a sulfonate or derivatives thereof.

In another embodiment, the sulfonate is an alkaline and/or alkaline earth sulfonate.

In another embodiment, the fire retardant is at least one of the following: potassium fluorosulfonate or derivatives thereof; KSS, NATS (sodium p-tolylsulfonate), and ionomer.

In another embodiment, the fire retardant does not contain a bromine and/or chlorine containing molecules.

When present, the foregoing flame retardant additives are generally present in amounts of 0.01 to 10 wt. %, more specifically 0.02 to 5 wt. %, based on 100 parts by weight of the polymer component of the thermoplastic composition.

The compositions can include additional types of thermoplastic polymers.

In one embodiment, the compositions can comprise polyesters, polyamides, and other polycarbonate homopolymers and copolymers, including polycarbonate-polysiloxane copolymers and polyester carbonates, also known as a polyester-polycarbonates, and polyesters.

The thermoplastic composition can include various additives ordinarily incorporated in polycarbonate compositions of this type, with the proviso that the additives are selected so as to not significantly adversely affect the desired properties of the polycarbonate, for example, transparency and flame retardance. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the composition.

Exemplary antioxidant additives include, for example, organophosphites such as tris(nonyl phenyl)phosphite, tris (2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weigh of the polymer component of the thermoplastic composition (excluding any filler).

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the polymer component of the thermoplastic composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 parts by weight, based on 100 parts by weight of the polymer component of the thermoplastic composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 part by weight, based on 100 parts by weight of the polymer component of the thermoplastic composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like;

combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the thermoplastic composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the thermoplastic composition.

Where a foam is desired, useful blowing agents include, for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of 0.01 to 20 parts by weight, based on 100 parts by weight of the polymer component of the thermoplastic composition.

Anti-drip agents can also be used in the thermoplastic composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the polymer component of the thermoplastic composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the thermoplastic composition.

Various methods of blending the components can be utilized. One of ordinary skill in the art could blend the components of the formulation without undue experimentation. For example, an endcapped polycarbonate, flame retardant, impact modifier (if present), and/or other optional components are first blended in a HENSCHEL-Mixer® high speed mixer. Other low shear processes, including but not limited to hand mixing, can also accomplish this blending. The blend is then fed into the throat of a single or twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals.

In one embodiment, an article of manufacture that contains the compositions encompassed by the disclosure is at least one of the following: a television, a light emitting diode, an electrical component, a laptop computer, and a smartphone.

In another embodiment, the molded article can be an injected molded article or extruded molded article.

In a further embodiment, an extruded molded article from the compositions encompassed by this disclosure have has at least a UL94 V0 p(FTP) value of at least 0.9 at a thickness of 1.0 mm.

In a further embodiment, an injection molded article from the compositions encompassed by this disclosure have has at least a UL94 V0 p(FTP) value of at least 0.9 at a thickness of 1.5 mm.

In another embodiment, a molded article containing a branched and/or linear polycarbonate containing composition embodied by this disclosure is disclosed.

The compositions of the present disclosure have various resultant properties.

In one embodiment, the composition has a haze value less than 3% at 3 mm thickness by ASTM D1003

In another embodiment, the composition has a notched izod impact strength that is at least about 50 J/m as measured by ASTM D256.

In another embodiment, the composition has a melt flow range from about 3 g/10 min to less than about 45 g/10 min as measured by ASTM D 1238.

In a preferred embodiment, the composition has a linear polycarbonate of about 70 wt % High Flow PC-1 and about 30 wt % Branched PC based upon weight of polycarbonate, a heat stabilizer in the amount of about 0.06 wt % of the total weight of the composition, potassium perfluorobutane in the amount of about 0.08 wt % of the total weight of the composition, a polymethylphenyl siloxane in the amount of about 0.4 wt % of the total weight of the composition, and octaphenyl cyclotetrasiloxane in the amount of about 0.1 wt % of the total weight of the composition. In a further embodiment, the amount of chemistry added provides a molded article of said composition with a UL94 V0 p(FTP) value of 0.90 or greater at a thickness of between 1 mm and 2.5 mm or at 2.5 mm or at 1.5 mm or at 1 mm.

In another preferred embodiment, the linear polycarbonate is about 40 wt % High Flow PC-2 and about 60 wt % Branched PC based upon weight of polycarbonate, a heat stabilizer in the amount of about 0.06 wt % of the total weight of the composition, potassium perfluorobutane in the amount of about 0.08 wt % of the total weight of the composition, a polymethylphenyl siloxane in the amount of 0.4 wt % of the total weight of the composition, and octaphenyl cyclotetrasiloxane in the amount of 0.1 wt % of the total weight of the composition. In further embodiment, the amount of chemistry added provides a molded article of said composition with a UL94 V0 p(FTP) value of 0.90 or greater at a thickness of between 1 mm and 2.5 mm or at 2.5 mm or at 1.5 mm or at 1 mm.

Ranges articulated within this disclosure, e.g. numerics/values, shall include disclosure for possession purposes and claim purposes of the individual points within the range, sub-ranges, and combinations thereof.

The following examples are not meant to be limiting.

EXAMPLES

A. Testing Procedure & Description of Testing Components

Different composition of flame-retarded additives and PC are mixed together and pre-blended. Extrusion and molding is carried out under normal polycarbonate processing condition.

Flammability testing was conducted using the standard Underwriters Laboratory UL 94 test method (7 day conditioning), except that 20 bars rather than the usual 5 bars were tested. Specimens are to be preconditioned in an air-circulating oven for 168 hours at 70+_1° C. and then cooled in the desiccator for at least 4 hours at room temperature, prior to testing. Once removed from the desiccator, specimens shall be tested within 30 minutes. The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. Preferably p(FTP) values will be 1 or very close to 1 for high confidence that a sample formulation would achieve a V0 rating in UL 94 testing. A p(FTP) value below 0.85 for a sample formulation was considered too low to predict a UL 94 rating of V0 for that formulation.

TABLE 1

| Material | Description | Source |
| --- | --- | --- |
| High flow PC-1 | High flow BPA polycarbonate resin made by the interfacial process having a weight average molecular weight (Mw) of 22000 as determined by gel permeation chromatography (GPC) using polycarbonate standards; Structure/Endcap = LF process/PCP endcap; and MVR = 21.9 to 31.8 | SABIC Innovative Plastics |
| High flow PC-2 | High flow BPA polycarbonate resin made by melt process having a weight average molecular weight (Mw) of 22000 as determined by GPC using polycarbonate standards; Structure/Endcap = LX process/phenol endcap; and MVR = 25 to 35 | SABIC Innovative Plastics |
| Low flow PC-1 | Low flow BPA polycarbonate resin made by the interfacial process having a weight average molecular weight (Mw) of 30000 as determined by GPC using polycarbonate standards Structure/Endcap = LF process/PCP endcap; and MVR = 5 to 7 | SABIC Innovative Plastics |
| Ultra High flow PC-1 | Ultra high flow BPA polycarbonate resin made by the interfacial process having a weight average molecular weight (Mw) of 17650 as determined by GPC using polycarbonate standards; Structure/Endcap = LF process/PCP endcap; and MVR = 60 to 80 | SABIC Innovative Plastics |
| Ultra high flow PC-2 | Ultra high flow BPA polycarbonate resin made by melt process having a weight average molecular weight (Mw) of 17400 as determined by GPC using polycarbonate standards; Structure/Endcap = LX process/phenol endcap; and MVR = 65 to 80 | SABIC Innovative Plastics |
| Branched PC | Branched BPA polycarbonate resin made by the interfacial process having a weight average molecular weight (Mw) of 37700 as determined by GPC using polycarbonate standards; Structure/Endcap = LF process/PCP endcap; and MVR = 1 to 4 | SABIC Innovative Plastics |
| HBN 3% THPE branched resin | Branched BPA polycarbonate resin made by the interfacial process having a weight average molecular weight (Mw) of 30000 as determined by GPC using polycarbonate standards; Structure/Endcap = LF process/HBN endcap; and MVR = 5 to 12 | SABIC Innovative Plastics |
| Phenol 3% THPE branched resin | Branched BPA polycarbonate resin made by the interfacial process having a weight average molecular weight (Mw) of 30000 as determined by GPC using polycarbonate standards; Structure/Endcap = LF process/Phenol endcap; and MVR = 5 to 12 | SABIC Innovative Plastics |
| tButyl phenol 3% THPE branched resin | Branched BPA polycarbonate resin made by the interfacial process having a weight average molecular weight (Mw) of 30000 as determined by GPC using polycarbonate standards; Structure/Endcap = LF process/tButyl phenol endcap; and MVR = 5 to 12 | SABIC Innovative Plastics |

MVR was tested by ASTM D 1238.
Notched Izod Impact (NII) data were obtained according to ASTM D256.

B. Results

Experiments were performed using linear polycarbonates with combinations of the silicone additives: octaphenyl cyclotetrasiloxane and poly(phenylmethylsiloxane) (TSF437), potassium perfluorobutane sulfonate (Rimar Salt). The results are summarized in Table 2. The siloxane additives act as a flame retardant synergist with the Rimar salt to give better FR performance robustness. Batch 1-1 (no siloxane additive) has the lowest p(FTP) value compared with Batches 1-2, 1-3, 1-4, 1-5 (all contain one or more siloxane additives). Table 2 also shows the benefits of combining the cyclic and linear siloxanes versus using either separately. Batches 1-4 and 1-5 that employ combinations of cyclic and linear siloxane yield higher p(FTP) values than Batch 1-2 (cyclic siloxane alone) or Batch 1-3 (linear siloxane alone).

TABLE 2

| | | Batch 1-1 | Batch 1-2 | Batch 1-3 | Batch 1-4 | Batch 1-5 |
| --- | --- | --- | --- | --- | --- | --- |
| | High flow PC-1 | 50 | 50 | 50 | 50 | 60 |
| | Low flow PC-1 | 50 | 50 | 50 | 50 | 40 |
| | Heat Stabilizer 1 | 0.03 | 0.03 | 0.03 | 0.03 | 0.03 |
| | Heat Stabilizer 2 | 0.06 | 0.06 | 0.06 | 0.06 | 0.06 |
| | potassium perfluorobutane sulfonate | 0.08 | 0.08 | 0.08 | 0.08 | 0.08 |
| | Octaphenyl cyclotetrasiloxane | | 0.1 | | 0.1 | 0.1 |
| | Polymethylphenyl siloxane | | | 0.3 | 0.3 | 0.3 |
| MVR | g/10 min | 12.1 | 12.5 | 12.4 | 12.4 | 13.3 |
| Appearance | | Transparent | Transparent | Transparent | Transparent | Transparent |
| Flame test: UL94 Rating | 2.5 mm (pFTP) | V2 (0.03 with 4 drips) | V2 (0.56 with 1 drips) | V0 (0.82) | V0 (0.99) | V0 (0.96) |

As shown in Table 3, compositions with 5~78% branched polycarbonate, potassium perfluorobutane sulfonate with a combination of the cyclic siloxane and line siloxane additives were evaluated for their UL flame performance capability based on their p(FTP) values using the test method described above. With 30% branched PC and 0.35% octaphenyl cyclotetrasiloxane (Batch 1-3), the composite has a p(FTP) value of 0.49 at 1.5 mm while Batches 1-7 and 1-8 with similar branched polycarbonate content and comparable MVR values but having a combination of a linear siloxane and cyclic siloxane additive also present have p(FTP) values of 0.94 and 1.00 respectively. In Batch 1-4 to Batch 1-6, different types of poly(phenylmethsiloxane) resins available from Dow Corning Corporation were also screened. 220 Flake Resin and 255 Flake Resins can give better UL94 FR performance which show V0 capability at wall thickness of 1.5 mm, however, both of these two samples were hazy. For Batch 1-6, 217 Flake Resin did not show any positive effect wrt. FR performance. For the batches (Batch 1-7 & Batch 1-8) (Batch 1-10 & Batch 1-11), 0.4% Polymethylphenyl siloxane (TSF437 obtained from Toshiba Silicone Co., Ltd.) and 0.1% octaphenyl cyclotetrasiloxane shows excellent synergistic effect to balance all FR and optical and physical properties. All these samples are predicted to robustly pass UL94 V0 rating at 1.5 mm based on their high p(FTP) values and meanwhile, the transmission, haze and notch izod impact are maintained.

performance for resins that have high levels of branching and with alternative end-capping agents as shown in Table 4 below. The resins in Table 4 illustrated by Ex-7, Ex-8, Ex-9, and Ex-13 have branching levels of 3% using THPE as the branching agent and employ three different end-capping agents, p-cyanophenol (labeled HBN in Table 4), phenol and p-t-butylphenol (tButylphenol in the Table 4). In each case the use of the linear and cyclic siloxane combination provided p(FTP) values greater than 0.90 at 1.5 mm even with MVR values as high as 34.7. Furthermore they retained high ductility (100% ductile) in a notched izod impact test. By comparison a sample that did not employ any cyclic siloxane or any linear siloxane in the formulation, CEX-1, even though it possessed a p(FTP) value of grater than 0.9 at 1.5 mm, and with excellent haze and transmis-

TABLE 3

| | | Batch 1-1 | Batch 1-2 | Batch 1-3 | Batch 1-4 | Batch 1-5 | Batch 1-6 | Batch 1-7 | Batch 1-8 | Batch 1-9 | Batch 1-10 | Batch 1-11 |
|---|---|---|---|---|---|---|---|---|---|---|---|---|
| | High flow PC-1 | 78 | | 70 | 70 | 70 | 70 | 70 | 5 | | | 22 |
| | High flow PC-2 | | 20 | | | | | | | | | |
| | Ultra high flow PC-1 | 17 | | | | | | | 55 | | | |
| | Ultra high flow PC-2 | | 70 | | | | | | | 40 | 40 | |
| | Branched PC | 5 | 10 | 30 | 30 | 30 | 30 | 30 | 40 | 60 | 60 | 78 |
| | Heat Stabilizer | 0.06 | 0.06 | 0.06 | 0.06 | 0.06 | 0.06 | 0.06 | 0.06 | 0.06 | 0.06 | 0.06 |
| | potassium perfluorobutane sulfonate | 0.08 | 0.08 | 0.08 | 0.08 | 0.08 | 0.08 | 0.08 | 0.08 | 0.08 | 0.08 | 0.08 |
| | 220 silicon resin from Dow Corning | | | | 0.4 | | | | | | | |
| | 255 silicon resin from Dow Corning | | | | | 0.4 | | | | | | |
| | 217 silicon resin from Dow Corning | | | | | | 0.4 | | | | | |
| | Polymethylphenyl siloxane | | 0.4 | | | | | 0.4 | 0.4 | | 0.4 | 0.4 |
| | Octaphenyl cyclotetrasiloxane | 0.35 | 0.1 | 0.35 | 0.1 | 0.1 | 0.1 | 0.1 | 0.1 | 0.35 | 0.1 | 0.1 |
| MVR | g/10 min | 31 | 39 | 13.2 | 13.6 | 12.6 | 13.3 | 12.5 | 13 | 7.6 | 7.6 | 4 |
| Appearance | | Transparent | Transparent | Transparent | Haze | Haze | Transparent | Transparent | Transparent | Transparent | Transparent | Transparent |
| Notch izod impact | J/m | 713 | 90 | 794 | 668 | 785 | 808 | 809 | 780 | 760 | 750 | — |
| Flame test: UL94 Rating | 3.0 mm (pFTP) | V0 (0.92) | | | | | | | | | | |
| | 2.5 mm (pFTP) | | V0 (0.90) | | | | | | | | | |
| | 1.5 mm (pFTP) | | | (0.49) | V0 (0.99) | V0 (0.97) | (0.58) | V0 (0.94) | V0 (1.00) | V0 (0.93) | | |
| | 1.2 mm (pFTP) | | | | | | | | | | V0 (0.95) | |
| | 1.0 mm (pFTP) | | | | | | | | | | | V0 (0.90) |

The combination of cyclic siloxane and linear siloxane also provides high p(FTP) values and high notched impact sion, had lower ductility performance (only 80% ductile) in the notched izod test.

TABLE 4

| | | Ex-7 | Ex-8 | Ex-9 | Ex-13 | CEx-1 |
|---|---|---|---|---|---|---|
| HBN 3% THPE branched resin | % | 22.00 | | | 47 | 35.00 |
| Phenol 3% THPE branched resin | % | | 22.00 | | | |
| tButyl phenol 3% THPE branched resin | % | | | 22.00 | | |
| Branched PC | % | 11.00 | 11.00 | 11.00 | 4.00 | |
| High flow PC | % | 52.00 | 52.00 | 52.00 | 20.00 | 49.00 |
| Low flow PC | % | | | | 29 | 16.00 |

TABLE 4-continued

|  |  | Ex-7 | Ex-8 | Ex-9 | Ex-13 | CEx-1 |
|---|---|---|---|---|---|---|
| Ultra-high flow PC | % | 15 | 15 | 15 |  |  |
| Heat stabilizer | % | 0.08 | 0.08 | 0.08 | 0.08 | 0.08 |
| OCTAPHENYLCYCLOTETRASILOXANE | % | 0.05 | .05 | 0.05 | 0.05 |  |
| Polymethylphenyl siloxane | % | 0.4 | 0.4 | 0.4 | 0.4 |  |
| MVR | % | 19.1 | 19.8 | 19.6 | 34.7 | 13.5 |
| Transmission@3.0 mm | cc/10 min | — | — | — | — | 90.4 |
| Haze@3.0 mm | % | — | — | — | — | 2.1 |
| Notch Izod Impact/23 C. | % | 608 | 608 | — | 623 | 549 |
| Ductility | J · m | 100 | 100 | — | 100 | 80 |
| UL 94 Rating @ 1.5 mm | % | 0.99 | 0.99 | 0.94 | 0.99 | 0.98 |

C. General Method for Preparing Polycarbonates with High Branching Contents (3% Branching)

The following were added into a 70 L CSTR (continuous stir tank reactor) equipped with an overhead condenser and a recirculation pump with a flow rate of 40 L/minute: (a) 4,4-bis-(hydroxyphenyl)-2,2-propane (BPA) (4500 g, 19.73 mol); (b) p-hydroxybenzonitrile (251 g, 1.67 mol); 1,1,1-tris(4-hydroxyphenyl)ethane (THPE, 196 g, 0.84 mol); (c) triethylamine (42 mL, 0.415 mol); (d) methylene chloride (24.4 L); (e) de-ionized water (10.6 L), and (f) sodium gluconate (10 g). The reaction was allowed to stir for 10 minutes and the pH was maintained between 8 and 9 by the addition of 30 wt-% NaOH solution. The mixture was charged with phosgene (2404 g, 80 g/min, 24.32 mol). During the addition of phosgene, base (30 wt-% NaOH in deionized water) was simultaneously charged to the reactor to maintain the pH of the reaction between 9 and 10. After the complete addition of phosgene, the reaction was purged with nitrogen gas, and the organic layer was extracted. The organic extract was washed once with dilute hydrochloric acid (HCl); and subsequently washed with de-ionized water three times. The organic layer was precipitated from methylene chloride into hot steam. The polymer was dried in an oven at 110 deg C. before analysis. The Mw of the polycarbonate was measured to be 29,478 g/mol (referenced to polycarbonate standards) and polydispersity index=3.58.

The experimental method above is a general method to prepare branched polycarbonate resins with 3% branching levels having various end-capping agents. The three polycarbonate resins with the three different end-capping agents (labeled as HBN, Phenol, tbutylphenol in Table 4) were all prepared using this general method. However two different reactor sizes were used in the polycarbonate resin preparations: An reactor able to supply 8 lbs of polycarbonate resin was used to produce the polycarbonate resin made with the p-t-butylphenol end-capping agent while a reactor size able to supply 600 lbs. of polycarbonate resin was used with the phenol, and p-cyanophenol end-capping agents.

We claim:

1. A composition comprising: (a) a branched polycarbonate resin, (b) a flame retardant, (c) at least one phenyl containing linear siloxane and at least one phenyl containing cyclic siloxane, and (d) a linear polycarbonate resin; wherein said branched polycarbonate is less than 100 wt % based upon the weight percent of total polycarbonate in said composition; wherein a molded article from said composition has a UL94 V0 p(FTP) value of 0.90 or greater at a thickness of between 1 mm and 2.5 mm;
   wherein the phenyl containing cyclic siloxane is a cyclic siloxane having a formula $(R'_2SiO)_y$, wherein R' is a monovalent phenyl containing hydrocarbon or a fluorinated phenyl containing hydrocarbon having from 1 to 18 carbon atoms; and y is a number from 3 to 12; and
   wherein the phenyl containing linear siloxane comprises a poly(phenylalkylsiloxane), wherein the poly(phenylalkylsiloxane) comprises an alkyl group having 1 to 18 carbon atoms;
   wherein said composition has a haze value less than 3% at 3 mm thickness by ASTM D1003.

2. The composition of claim 1, wherein branched polycarbonate resin has a weight average molecular weight of between about 26,000 and about 42,000 daltons based on polycarbonate standards.

3. The composition of claim 1, wherein the branched polycarbonate resin comprises repeat units derived from a branching agent added during polymerization, wherein the branching agent is at least one of the following branching agents:

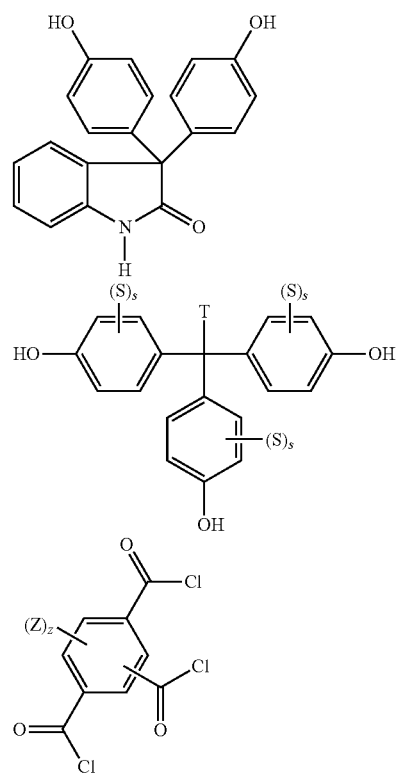

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3;
wherein T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

4. The composition of claim 1, wherein a branching level of said branched polycarbonate resin is from about 0.05 wt % to about 4.2 wt %.

5. The composition of claim 1, wherein said branched polycarbonate has an end-cap containing at least one of the following: phenol, alkyl-substituted phenols, ester-substituted phenols, cyano-substituted phenols, and halogen substituted phenols.

6. The composition of claim 1, wherein the linear polycarbonate resin has a weight average molecular weight of between about 26,000 and about 42,000 daltons based on polycarbonate standards.

7. The composition of claim 1, wherein an extruded molded article from said composition has at least a UL94 V0 p(FTP) value of at least 0.9 at a thickness of 1.0 mm.

8. The composition of claim 1, wherein an injection molded article from said composition has at least a UL94 V0 p(FTP) value of at least 0.9 at a thickness of 1.5 mm.

9. The composition of claim 1, wherein said composition contains about 95 wt % or less of the linear polycarbonate resin based on the weight of the total polycarbonate.

10. The composition of claim 1, wherein said total polycarbonate has about 5 wt % to about 70 wt % of the branched polycarbonate resin.

11. The composition of claim 1, wherein said flame retardant contains a sulfonate salt or derivatives thereof.

12. The composition of claim 1, wherein said flame retardant is a potassium perfluoroalkylsulfonate salt or derivatives thereof.

13. The composition of claim 1, wherein said flame retardant is at least one of the following: potassium diphenylsulfon-3-sulfonate, sodium p-tolylsulfonate, and ionomer.

14. The composition of claim 1, wherein said flame retardant does not contain a bromine and/or chlorine containing molecules.

15. The composition of claim 1, wherein the phenyl containing cyclic siloxane comprises octaphenyl cyclotetrasiloxane, and wherein the phenyl containing linear siloxane comprises a poly(phenylmethylsiloxane) having the following structure

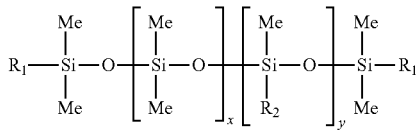

wherein $R_1$ is a $C_{1-18}$ alkyl group, $R_2$ is phenyl, and a ratio of x and y sums to 1.

16. The composition of claim 15 wherein said composition has between about 0.1 wt % and about 0.8 wt % poly(phenylmethylsiloxane) and about 0.1 wt % to 0.8 wt % octaphenyl cyclotetrasiloxane based on the total weight of the composition.

17. The composition of claim 16, wherein said flame retardant is potassium perfluorobutane sulfonate or perfluoromethane sulfonate or mixtures thereof.

18. The composition of claim 1, wherein the composition has a notched izod impact strength that is at least about 50 J/m.

19. The composition of claim 1, wherein said composition has a melt flow range from about 3g /10min to less than about 45g/10min.

20. The composition of claim 1, wherein said linear polycarbonate is about 70 wt % of an interfacial polycarbonate with a weight average molecular weight of 22000 g/mol and a melt flow of 21.9 to 31.8 g/10 min as determined by ASTM D 1238 and about 30 wt % Branched polycarbonate based upon weight of polycarbonate, a heat stabilizer in the amount of about 0.06 wt % of the total weight of the composition, potassium perfluorobutane sulfonate in the amount of about 0.08 wt % of the total weight of the composition, a poly(phenylmethylsiloxane) in the amount of about 0.4 wt % of the total weight of the composition, and octaphenyl cyclotetrasiloxane in the amount of about 0.1 wt % of the total weight of the composition.

21. An article of manufacture comprising the composition of claim 1.

22. The article of claim 21 wherein said article is at least one of the following: a television, a light emitting diode, an electrical component, a laptop computer, and a smartphone.

23. The composition of claim 1, wherein the molded article from said composition has a UL94 V0 p(FTP) value of 0.90 or greater at a thickness of 1.5 mm.

24. The composition of claim 1, wherein said linear polycarbonate is about 70 wt % of an interfacial polycarbonate with a weight average molecular weight of 22000 g/mol and a melt flow of 21.9 to 31.8 g/10 min as determined by ASTM D 1238 and about 30 wt % branched polycarbonate based upon weight of polycarbonate, a heat stabilizer in the amount of about 0.06 wt % of the total weight of the composition, potassium perfluorobutane in the amount of about 0.08 wt % of the total weight of the composition, a poly(phenylmethylsiloxane) in the amount of about 0.4 wt % of the total weight of the composition, and octaphenyl cyclotetrasiloxane in the amount of about 0.1 wt % of the total weight of the composition, and wherein a molded article from said composition with a UL94 V0p(FTP) value of 0.90 or greater at a thickness of 1.5 mm.

25. The composition of claim 1, wherein the molded article from said composition has a UL94 V0 p(FTP) value of 0.90 or greater at a thickness of 1 mm.

26. The composition of claim 1, wherein a molded article from said composition has at least a UL94 V0 p(FTP) value of at least 0.9 at a thickness of 2.0 mm.

27. The composition of claim 1, wherein said composition comprises between about 0.1 wt % and about 0.8 wt % of the phenyl containing linear siloxane based on the total weight of the composition.

28. A composition comprising: (a) a branched polycarbonate resin, (b) a flame retardant, (c) poly(phenylmethyl siloxane) and octaphenyl cyclotetrasiloxane, and (d) a linear polycarbonate resin; wherein said branched polycarbonate is less than 100 wt % based upon the weight percent of total polycarbonate in said composition; wherein a molded article from said composition has a UL94 V0 p(FTP) value of 0.90 or greater at a thickness of between 1 mm and 2.5 mm; wherein said composition has a haze value less than 3% at 3 mm thickness by ASTM D1003.

29. A composition comprising: (a) a branched polycarbonate resin, (b) a flame retardant, (c) at least one phenyl containing linear siloxane and at least one phenyl containing cyclic siloxane, and (d) a linear polycarbonate resin; wherein said branched polycarbonate is less than 100 wt % based upon the weight percent of total polycarbonate in said composition; wherein a molded article from said composition has a UL94 V0 p(FTP) value of 0.90 or greater at a thickness of between 1 mm and 2.5 mm;
wherein the phenyl containing cyclic siloxane is a cyclic siloxane having a formula $(R'_2SiO)_y$, wherein R' is a monovalent phenyl containing hydrocarbon or a fluorinated phenyl containing hydrocarbon having from 1 to 18 carbon atoms; and y is a number from 3 to 12; and wherein the phenyl containing linear siloxane comprises a poly(phenylalkylsiloxane), wherein the poly(phenylalkylsiloxane) comprises an alkyl group having 1 to 18 carbon atoms;

wherein said polycarbonate comprises about 40 wt % of the linear polycarbonate based upon the weight of the polycarbonate with a weight average molecular weight of 22000 g/mol and a melt flow of 25 to 35 g/10 min as determined by ASTM D 1238 and about 60 wt % Branched polycarbonate based upon the weight of polycarbonate, wherein the composition comprises a heat stabilizer in the amount of about 0.06 wt % of the total weight of the composition, potassium perfluorobutane sulfonate in the amount of about 0.08 wt % of the total weight of the composition, a poly(phenylmethylsiloxane) in the amount of 0.4 wt % of the total weight of the composition, and octaphenyl cyclotetrasiloxane in the amount of 0.1 wt % of the total weight of the composition.

30. The composition of claim 29, wherein said composition has a haze value less than 3% at 3mm thickness by ASTM D1003.

31. A composition comprising: (a) a linear polycarbonate resin, (b) a flame retardant, (c) at least one phenyl-containing linear siloxane and at least one phenyl-containing cyclic siloxane, wherein a molded article from said composition has a UL94 V0p(FTP) value of 0.90 or greater at a thickness of between 1 mm and 2.5 mm;

wherein the phenyl-containing cyclic siloxane is a cyclic siloxane having a formula $(R'_2SiO)_y$ wherein R' is a monovalent phenyl containing hydrocarbon or a fluorinated phenyl containing hydrocarbon having from 1 to 18 carbon atoms and y is a number from 3 to 12; and wherein the phenyl-containing linear siloxane comprises a poly(phenylalkylsiloxane); wherein the poly(phenylalkylsiloxane) comprises an alkyl group having 1 to 18 carbon atoms;

wherein said composition has a haze value less than 3% at 3 mm thickness by ASTM D1003.

32. The composition of claim 31, wherein said linear polycarbonate resin is a blend of linear polycarbonate resin.

33. The composition of claim 32 wherein at least one of the linear polycarbonates in the blend is bisphenol-A polycarbonate.

34. The composition of claim 33 wherein at least one of the linear polycarbonates is a copolycarbonate or a polycarbonate copolymer.

35. The composition of claim 32, wherein a molded article from said composition with a UL94 V0 p(FTP) value of 0.90 or greater at a thickness of 1.5 mm.

36. The composition of claim 31 wherein the flame retardant is potassium perfluorobutane sulfonate.

37. The composition of claim 31 wherein the phenyl-containing linear siloxane has the structure

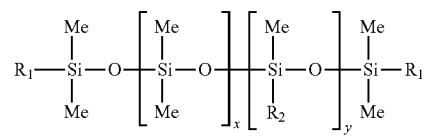

wherein $R_1$ is a $C_{1-18}$ alkyl group, $R_2$ is phenyl, and a ratio of sums to a value of 1, and wherein the phenyl-containing cyclic siloxane is octaphenylcyclotetrasiloxane.

38. The composition of claim 37, wherein the phenyl-containing linear siloxane is a poly(phenylmethylsiloxane).

39. A molded article containing the composition of claim 31.

40. The composition of claim 31, wherein the molded article from said composition has a UL94 V0 p(FTP) value of 0.90 or greater at a thickness of 1.5 mm.

* * * * *